J. WOOLCOCK.
MOLDING OF CONCRETE PRODUCTS SUCH AS BLOCKS, PANELS, STRUCTURES, AND THE LIKE.
APPLICATION FILED JUNE 16, 1920.

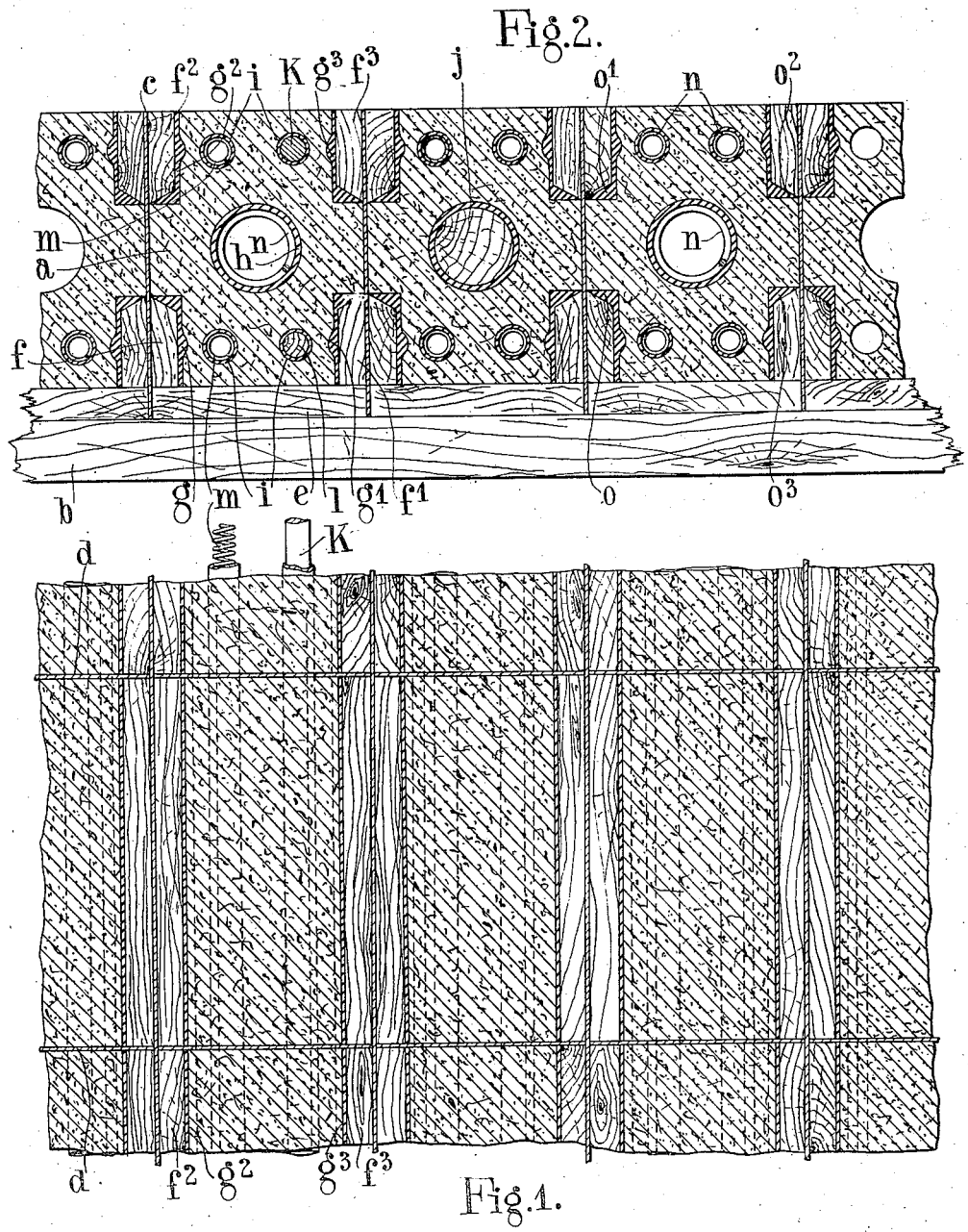

1,423,983.

Patented July 25, 1922.

Inventor
J. Woolcock.
By H. R. Kerslake
Atty.

UNITED STATES PATENT OFFICE.

JOHN WOOLCOCK, OF LONDON, ENGLAND, ASSIGNOR TO WILLIAM JOHN STEWART, OF LONDON, ENGLAND.

MOLDING OF CONCRETE PRODUCTS SUCH AS BLOCKS, PANELS, STRUCTURES, AND THE LIKE.

1,423,983.  Specification of Letters Patent.  Patented July 25, 1922.

Application filed June 16, 1920. Serial No. 389,447.

*To all whom it may concern:*

Be it known that I, JOHN WOOLCOCK, a subject of the King of Great Britain and Ireland, and residing at 12 Berkeley Street, London, W. 1, England, have invented certain new and useful Improvements in or Relating to the Molding of Concrete Products Such as Blocks, Panels, Structures, and the like, of which the following is a specification.

This invention relates to molding surfaces or formwork for concrete construction of all kinds and more particularly to cases in which the concrete is mixed to such a consistency that it may be poured into the molding receptacle or the like. It is further of advantage where it is desirable that the retaining or molding surfaces be removed as quickly as possible as, for example, in repetition production.

In molding concrete as at present generally carried out, wood or metal in the majority of instances constitutes the contacting surfaces, and the amount of cohesion between the concrete and such material often prevents the removal thereof without damage until a considerable period has elapsed after casting.

The skin friction also presents considerable difficulties in the way of removal in a parallel direction by sliding one surface over the other, thus often necessitating the use of expensive, collapsible or detachable structures, or the provision of objectionable tapering, particularly where cores for apertures or hollow products are required.

The object of the present invention is to overcome the foregoing difficulties and to provide for the execution of concrete molding in an expeditious and improved manner.

The invention consists broadly in the use of india rubber or material having similar properties for the contacting surfaces when molding concrete elements or structures.

The invention further consists in the use of hollow forms of rubber or the like which may be provided with interior supporting means for the production of apertures, cavities or the like in concrete constructions.

The invention further consists in a method of forming concrete elements or structures by applying concrete of a consistency which may be poured in or upon molding surfaces of rubber or the like.

The invention also consists in the improved methods of and (or) means for forming or casting concrete as hereinafter described.

Referring now to the accompanying drawings:—

Figures 1 and 2 show a sectional plan and elevation of apparatus for forming concrete building blocks in accordance with the invention;

Figures 3 and 4 show another application of the invention to the formation of chimney flues or the like;

Figure 3:
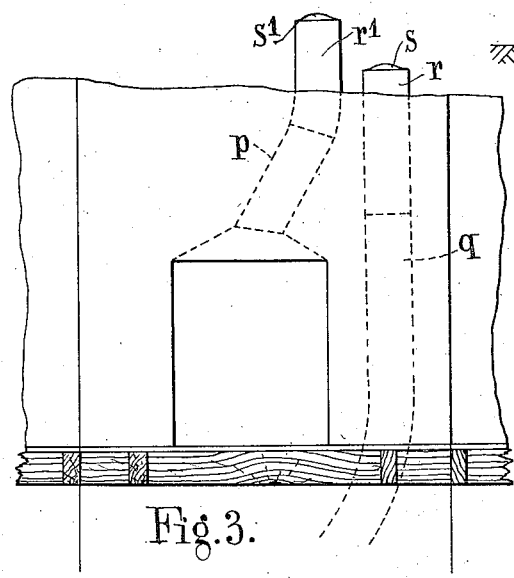

When operating in accordance with the invention as shown by way of example in Figures 1 and 2, hollow concrete blocks $a$ for use in reinforced concrete structures are formed in molds as hereinafter described.

Upon the molding floor $b$ there is erected a series of longitudinal partition plates $c$ which may be of a length sufficient to accommodate any convenient number, say up to about six blocks positioned end to end, and between these are inserted transverse partitions $d$ formed of a continuous series of short division plates inserted between the longitudinal partitions $c$, the whole being retained in position by the bottom pallets or members $e$ which may correspond in length with the plates $c$.

Running longitudinally of the compartments along the bottom angles are inserted filling blocks $f$, $f'$, faced with a veneer $g$, $g'$ of rubber or material having similar properties and in the upper corners of the compartments similar filling blocks $f^2$, $f^3$ faced in the same manner at $g^2$, $g^3$ are also inserted, said filling blocks advisably being attached to the partitions $c$.

To form the cavities in the blocks central cores $h$ and additional cores $i$ above and below the central cores are carried upon suitable supports, said cores being all formed of tubes of rubber or like material supported upon filling in the shape of wooden or metal rods or bars as shown at $j$, $k$ and $l$ or upon helical spring members $m$ or $n$.

The filling rods or helical members are carried through the transverse partitions $d$ by means of which they are supported.

the rubber or like being also in continuous lengths if desired.

As soon as the concrete mixture has been filled into the molds, and the initial set has occurred, the filling members such as $j$, $k$, $l$, $m$ or $n$ may be immediately withdrawn and the partition plates removed from all accessible portions of the collection of blocks.

The exterior blocks are then easily taken away by manipulation of the bottom pallets or members $e$ and as soon as a block is separated and in a sufficiently dried condition, the corner filling blocks $f$, $f'$, $f^2$ and $f^3$, together with the central and smaller rubber cores $h$ and $i$ may be withdrawn, each block remaining upon its supporting bottom member $e$ until it is sufficiently matured for handling and stacking.

Another way of separating the blocks when supported upon longitudinal continuous pallets is to withdraw all the supports and cores from each succeeding longitudinal series and as each set are drawn, to move the series together with the pallet transversely away from the remainder so as to expose the next longitudinal partition plate $c$, the transverse partition plates may then be freed and withdrawn by curving the pallet over a convex bed or suitable supporting means.

By the employment of the rubber facing veneer $g$, $g'$, $g^2$ and $g^3$ upon the corner filling blocks, it is possible by the provision of thickened portions at the corners $o$, $o'$, $o^2$, $o^3$, to provide for perfectly square corners, as the thickened portions of the rubber or like material will be extended by withdrawal sufficiently to cause a thinning of the material and easy separation from the concrete without breaking the corner. It is also, if desirable, possible to form blocks with undercut angles in this way by providing a hollow cushion space within the corners $o$, $o'$, $o^2$, $o^3$, to allow of a further collapsing of these corners during withdrawal of the filling blocks.

In the application of the invention to the formation of any hollow bodies, apertures or holes of cylindrical or corresponding form, as hereinbefore described, instead of employing tapered or collapsible cores as is at present generally done, the core is formed of a rubber tube which may be temporarily supported in position upon a metal or wooden rod or bar or a spiral form or similar light structure. Alternatively, the form of the rubber tube, particularly when cylindrical, may be preserved by a gaseous fluid or liquid temporarily inserted and (or) confined therein.

The concrete is cast around the suitably supported core, and immediately the initial set has taken place or within an hour or two of casting, the support may be withdrawn and the rubber tube or the like can then be easily drawn out in an axial direction, the natural contraction of the rubber under tension giving the necessary clearance and the nature of the rubber surface precluding the cohesion which is found to exist with wood or metal surfaces.

In this way holes of quite small diameter and considerable length may be formed perfectly parallel and the cores withdrawn for use in other positions in a comparatively short time and without any possibility of damage to the concrete.

For all kinds of pre-cast elements such as hollow or solid blocks, panels or the like, rubber or material having similar properties may be used as a veneer for shuttering or like removable portions, an open frame being provided as a support for the shuttering, so that it may be easily removed as soon as the initial set has occurred, while the shuttering is left in position as a protection to the wet concrete until this is dried sufficiently for the parts to fall away or be readily removed.

Figure 4:
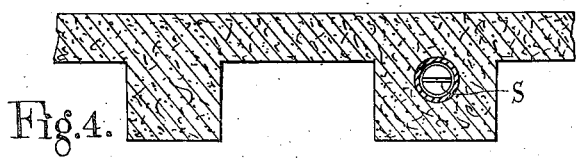

Figures 3 and 4 show the application of the invention to the formation of chimney flues, the flues $p$ and $q$ being carried up in the concrete wall as the building proceeds, and the core pieces $r$ or $r'$ consisting of tubes of rubber or similar material of a length sufficient for the height of work which will be executed in one day supported upon filling members which may be of rigid construction for the straight portions of the flues or of a flexible nature such as helical springs for any portions which are to be curved, the filling of the cores being conveniently fitted with handles $s$, $s'$ by means of which they may be drawn up and re-positioned for proceeding with the work.

Figure 5:
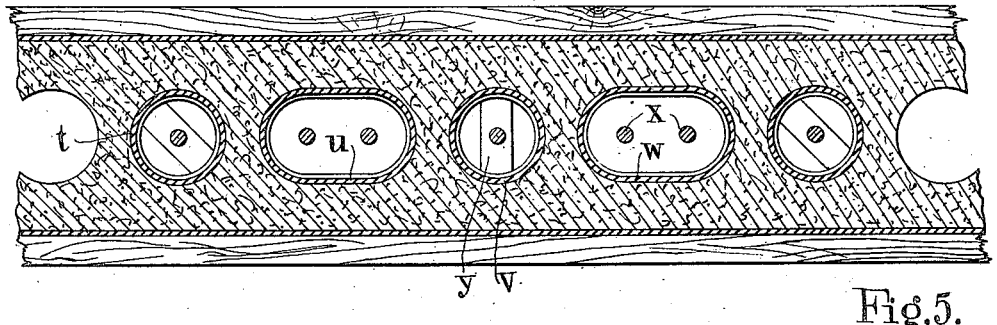
Figure 5 is a sectional plan showing the application of the invention to the formation of hollow concrete walls.

Figure 5 shows the application of the invention to the formation of hollow concrete walls which may be reinforced or not as desired. In this case the rubber cores $t$ or $u$ are made in lengths sufficient for a day's operations and are supported upon suitable hollow filling members $v$, $w$, which may be positioned from rods $x$ engaging cross pieces $y$ at the ends of the fillings. Where a rigid filling is employed, these may be drawn upwards upon the rod while the concrete is still wet without difficulty, the rubber being left for removal at a later stage, or the rubber may be supported upon helical or like more or less resilient filling which may be withdrawn in the most convenient manner.

For pipes, drains or sewers or the like, cores as hereinbefore described are easily adapted to the formation of the straight inclined or curved passages, as the material of the core may be made to accommodate itself by the use of temporary or other supporting means.

Figure 6:
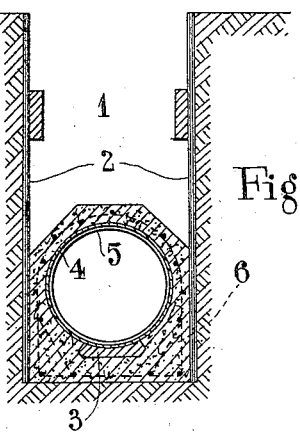
Figure 6 is a cross section showing the application of the invention to the construction of reinforced concrete pipes or drains.

Figure 6 shows a transverse section through a pipe line or sewer constructed in accordance with this invention in reinforced concrete.

In this figure a trench 1 is taken out to the required depth and is boarded as shown at 2 to the exterior width of the pipe structure. The bottom is then filled with sufficient concrete to form the lower wall of the pipe and a hollow determining the exact alignment is prepared therein, say for example, with suitable invert blocks 3 or strickling from screeds at suitable intervals throughout the length.

A core 4 formed of a tube of rubber or material having similar properties and of a length which may conveniently be drawn in an axial direction is then placed in position along the hollow, said core being either supported upon a helical or like withdrawable metal skeleton form 5 or alternatively filled with liquid or preferably gaseous fluid at a sufficient pressure to maintain its contour in opposition to any force which may be exerted by the concrete surrounding the core. Where a filling of fluid under pressure is employed, the tube may be provided with a non-extendible lining of fabric or other material so proportioned that it will permit the core to extend to the desired dimensions under pressure, but will prevent these dimensions from being exceeded with any pressure which is found necessary to withstand the external pressure of the concrete.

Where reinforcement as shown at 6 in the drawing is employed, the whole or lower part of the circumferential members are inserted in the concrete first placed in the bottom of the trench, together with the lower longitudinal reinforcement, the remainder being if desired added after the hollow has been formed in the bed and the core placed in position. As soon as the core is correctly positioned the trench may be filled with the remainder of the concrete which is formed to the desired exterior shape upon the upper side.

As soon as the concrete is sufficiently set the filling, if of a fluid nature, is released and the core withdrawn in an axial direction to be again employed for the production, if required, of a further length of pipe.

Where the core is supported upon a helical or like metallic or other filling, the withdrawal may be effected by first removing the filling and then the rubber tube, or in some instances the filling may be so constructed that the tension applied for withdrawal will produce a contraction in the diameter, and in such circumstances it may be possible to attach the rubber tube to the filling and withdraw both simultaneously.

For small and moderate sized pipes where cheap and rapid construction is desirable, a trench may be taken out of the required dimensions of the pipe and a bottom layer of concrete inserted and strickled to form the positioning hollow. A fluid supported core may then be placed in position and the remainder of the trench filled in, the fluid pressure being released and the core withdrawn for re-use immediately the initial set has occurred. In cases where pipes are situated above ground level, a channel formed of boarding or other suitable formwork may be employed in place of a trench.

The invention is particularly applicable to the formation of cavities, the size of which increase within the initial opening aperture. Such cores for a small increase in dimensions may be merely hollow and supported by their own resistance to deflection, and be withdrawn as soon as the concrete is sufficiently set by reason of the contraction which takes place upon sufficient force being applied to pull out the core. In other cases cores for this or any other purposes may be supported by gaseous or liquid fluid which may be given a sufficient pressure to maintain the shape of the core against the pressure of the concrete, the fluid filling being released and allowed to escape upon or before withdrawal of the core as soon as the concrete has reached such a stage as to be uninjured by this process.

By operating in accordance with this invention, not only may all formwork, molds, cores and the like be utilized to a far greater extent than where the concrete has to be left until it is sufficiently matured to withstand the strain of removing ordinary formwork, but a far better surface is produced and the maturing or seasoning is very rapidly effected owing to the actual surface of the concrete being exposed to the atmosphere much more quickly than under ordinary conditions.

It is to be understood that the examples given constitute only some applications of the invention, and that modifications and additions may be introduced without in any way departing from the spirit of this invention.

Having now described my invention, what I claim as new and desire to secure by Letters Patent is:—

1. Apparatus for molding pipes, drains, sewers and other conduits, comprising in combination a central contour determining member, the axis of which is deflectable and a tubular covering member therefor which forms the molding surface and is constructed of rubber substance and is axially extensible to effect transverse contraction and easy withdrawal from the molded conduit.

2. Apparatus for molding pipes, drains, sewers and other conduits, comprising in combination a central contour determining member extensible by an axial pull to produce transverse contraction and a tubular covering member therefor constructed of rubber substance and extensible under tension.

3. Apparatus for molding pipes, drains, sewers and other conduits, comprising in combination a central contour determining member extensible by an axial pull to produce transverse contraction and a tubular covering member therefor which forms the molding surface and is constructed of rubber substance and is axially extensible to effect transverse contraction and easy withdrawal from the molded conduit.

4. Apparatus for molding pipes, drains, sewers and other conduits, comprising in combination a central contour determining member, the axis of which is deflectable and which is extensible by an axial pull to produce transverse contraction and a tubular covering member therefor which forms the molding surface and is constructed of rubber substance and is axially extensible to effect transverse contraction and easy withdrawal from the molded conduit.

5. Apparatus for molding pipes, drains, sewers and other conduits, in which a helical coil forming a central contour determining member is covered by a tubular covering member which forms the molding surface and is constructed throughout of extensible rubber substance.

6. Apparatus for forming concrete products in which a covering constructed throughout of extensible rubber substance for molding concrete is supported by flexible filling means which may be withdrawn in a direction deviating from a straight line.

7. Apparatus for forming pipes, drains, sewers and other conduits, according to which a channel, adapted to determine the exterior proportions is provided with a hollow core of rubber substance which is maintained at the desired transverse dimensions by an interior filling comprising a helically disposed wire which upon removal after the core has been embedded in the concrete or the like allows transverse contraction of the core due to linear extension to enable its withdrawal to be effected in an axial direction.

8. A core for molding holes in concrete products and comprising a tube constructed throughout of rubber substance and adapted to be maintained at a determined size by a filling comprising a helical supporting coil which upon removal permit a sufficient contraction to provide for axial withdrawal of the core.

In testimony whereof I have signed my name to this specification.

JOHN WOOLCOCK.